US011432217B2

(12) United States Patent
Tang

(10) Patent No.: US 11,432,217 B2
(45) Date of Patent: *Aug. 30, 2022

(54) INTER-SYSTEM POLICY USING METHOD, USER EQUIPMENT, AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,641

(22) Filed: Sep. 1, 2020

(65) Prior Publication Data

US 2020/0404567 A1 Dec. 24, 2020

Related U.S. Application Data

(63) Continuation of application No. PCT/CN2018/079052, filed on Mar. 14, 2018.

(51) Int. Cl.
*H04W 36/14* (2009.01)
*H04W 8/12* (2009.01)
*H04W 28/24* (2009.01)
*H04W 36/00* (2009.01)

(52) U.S. Cl.
CPC ............. *H04W 36/14* (2013.01); *H04W 8/12* (2013.01); *H04W 28/24* (2013.01); *H04W 36/0022* (2013.01)

(58) Field of Classification Search
CPC ....... H04W 36/14; H04W 8/12; H04W 28/24; H04W 36/0022; H04W 88/06; H04W 8/18; H04W 48/18
USPC ......... 370/331; 455/414.1–414.2, 432.1–445, 455/448–452.2
See application file for complete search history.

(56) References Cited

U.S. PATENT DOCUMENTS

| 8,711,822 B2 | 4/2014 | De Vega De La Red |
| 10,602,422 B1 | 3/2020 | Jagannatha et al. |
| 10,708,836 B1 | 7/2020 | Buyukdura et al. |
| 10,972,956 B2 | 4/2021 | Huang-fu et al. |

(Continued)

FOREIGN PATENT DOCUMENTS

| CN | 101568162 A | 10/2009 |
| CN | 101631354 A | 1/2010 |

(Continued)

OTHER PUBLICATIONS

SA WG2 Meeting #120 S2-172012; Mar. 27-31, 2017, Busan Korea Huawei; TS 23.502: Discussion about QoS parameter mapping from 5GS to EPS and how to allocate TFT (Year: 2017).*

(Continued)

*Primary Examiner* — Michael Y Mapa
(74) *Attorney, Agent, or Firm* — Perkins Coie LLP

(57) ABSTRACT

A method includes: using a first UE policy applied to a first system when traffic is processed in the first system; and using a UE policy applied to a second system when traffic is processed in the second system, where the UE policy applied to the second system and the first UE policy applied to the first system are applied to same UE.

15 Claims, 2 Drawing Sheets

(56) References Cited

U.S. PATENT DOCUMENTS

| | | | |
|---|---|---|---|
| 2010/0322212 | A1 | 12/2010 | Vora |
| 2012/0020347 | A1 | 1/2012 | De Vega De La Red |
| 2013/0142042 | A1* | 6/2013 | Garcia Martin .. H04W 28/0268 370/230 |
| 2018/0227826 | A1 | 8/2018 | Abraham et al. |
| 2019/0124561 | A1 | 4/2019 | Faccin et al. |
| 2019/0297121 | A1 | 9/2019 | Qiao et al. |
| 2019/0306752 | A1 | 10/2019 | Lai |
| 2019/0335534 | A1 | 10/2019 | Atarius et al. |
| 2019/0394279 | A1 | 12/2019 | Dao et al. |
| 2020/0053622 | A1 | 2/2020 | Huang-fu et al. |
| 2020/0107190 | A1 | 4/2020 | Tang |
| 2020/0187088 | A1 | 6/2020 | Chun et al. |
| 2020/0228936 | A1 | 7/2020 | Talebi Fard et al. |
| 2020/0304983 | A1 | 9/2020 | Zhu et al. |
| 2020/0404107 | A1 | 12/2020 | Cheng et al. |
| 2020/0404567 | A1 | 12/2020 | Tang |
| 2020/0412559 | A1 | 12/2020 | Tang |
| 2021/0037380 | A1 | 2/2021 | Lee et al. |
| 2021/0194970 | A1 | 6/2021 | Li et al. |
| 2021/0195490 | A1 | 6/2021 | Rommer et al. |

FOREIGN PATENT DOCUMENTS

| | | | |
|---|---|---|---|
| CN | 101730174 | A | 6/2010 |
| CN | 103974383 | A | 8/2014 |
| CN | 107018542 | A | 8/2017 |
| CN | 107466483 | A | 12/2017 |
| CN | 108347748 | A | 7/2018 |
| CN | 108811000 | A | 11/2018 |
| CN | 109922472 | A | 6/2019 |
| EP | 2836018 | A1 | 2/2015 |
| EP | 3281473 | A1 | 2/2018 |
| EP | 3281473 | A4 | 4/2018 |
| WO | 2010115461 | A1 | 10/2010 |
| WO | 2017174550 | A1 | 10/2017 |
| WO | 2018145248 | A1 | 8/2018 |
| WO | 2019077011 | A1 | 4/2019 |

OTHER PUBLICATIONS

SA WG2 Meeting #120; S2-172012; Huawei; Mar. 27-31, 2017, Busan, Korea TS 23.502: Discussion about QoS parameter mapping from 5GS to EPS and how to allocate TFT (Year: 2017).*
3GPP TS 23.503 V15.0.0 (Dec. 2017); 3rd Generation Partnership Project; Technical Specification Group Services and System Aspects; Policy and Charging Control Framework for the 5G system; Stage 2 (Release 15) (Year: 2017).*
International Search Report in the international application No. PCT/CN2018/079052, dated Dec. 24, 2018.
English translation of the Written Opinion of the International Search Authority in the international application No. PCT/ CN2018/079052, dated Dec. 24, 2018.
3GPP TS 23.503 V15.1.0 (Mar. 2018), 3rd Generation Partnership Project; Technical Specification Group Services and System Aspects; Policy and Charging Control Framework for the 5G System; Stage 2(Release 15).
Nokia et al: "Discussion on PCC support of EPC IWK", 3GPP Draft; S2-180434_23503_Discussion on PCC Support of EPC IWK, 3rd Generation Partnership Project (3GPP), Mobile Competence Centre; 650, Route Des Lucioles; F-06921 Sophia-Antipolis Cedex; Franc vol. SA WG2, No. Gothenburg, Sweden; Jan. 22, 2018-Jan. 26, 2018 Jan. 16, 2018, XP051389858, the whole document.

Lenovo et al: "UE Policy configuration (23.503)", 3GPP Draft; S2-177244_UE_Policy_Configuration_23_503 V0_3, 3rd Generation Partnership Project (3GPP), Mobile Competence Centre; 650, Route Des Lucioles; F-06921, Sophia-Anti Polis Cedex; France, vol. SA WG2, No. Ljubljana, Slovenia; Oct. 23, 2017-Oct. 27, 2017 Oct. 22, 2017, XP051347200, the whole document.
Huawei et al: "TS 23.503 Pre-configured UE policy", 3GPP Draft; S2-177757 WAS 7719 7155 TS 23.503 Pre-Configured UE Policy, 3rd Generation Partnership Project (3GPP), Mobile Competence Centre; 650, Route Deslucioles; F-06921 Sophia-Antipolis Cedex; vol. SA WG2, No. Ljubljana, Slovenia Oct. 23, 2017-Oct. 27, 2017 Oct. 30, 2017, XP051360395, the whole document.
Huawei: "TS 23.502: Discussion about QoS parameter mapping from 5GS to EPS and how to allocate TFT", 3GPP Draft; S2-172012_TS 23.502 DI Scussion About SM Preparation for NX Supported Handover From 5GS to EPS,3rd Generation Partnership Project (3GPP), Mobile Competence Centre 650, Route Des Lucioles, vol. SA WG2, No. Busan, Korea; Mar. 27, 2017-Mar. 31, 2017 Mar. 26, 2017, XP051247745, the whole document.
"3rd Generation Partnership Project; Technical Specification Group Services and System Aspects; Policy and Charging Control Framework for the 5G System; Stage 2 (Release 15)", 3GPP Draft; 23503-F00, 3rd Generation Partnership Project (3GPP), Mobile Competence Centre: 650, Route Des Lucioles; F-06921 Sophia-Antipolis Cedex; France, Jan. 29, 2018, XP051384055, the whole document.
Supplementary European Search Report in the European application No. 18910013.4, dated Feb. 4, 2021.
First Office Action of the Chinese application No. 202010525735.1, dated Aug. 4, 2021. 29 pages with English translation.
Office Action of the Indian application No. 202027042605, dated Dec. 7, 2021. 6 pages with English translation.
3rd Generation Partnership Project; Technical Specification Group Services and System Aspects; Policy and Charging Control Framework for the 5G System; Stage 2 (Release 16), 3GPP TS 23.503 V16.0.0 (Mar. 2019). 84 pages.
Corrected Notice of Allowance of the U.S. Appl. No. 17/164,549, dated Nov. 10, 2021. 6 pages.
First Office Action of the Canadian application No. 3108401, dated Feb. 18, 2022. 4 pages.
First Office Action of the U.S. Appl. No. 17/164,549, dated Apr. 19, 2021. 23 pages.
International Search Report in the international application No. PCT/CN2019/096231, dated Apr. 1, 2020. 6 pages with English translation.
Notice of Allowance of the U.S. Appl. No. 17/164,549, dated Aug. 3, 2021. 14 pages.
NTT Docomo: "A new annex for session parameters mapping from EPS to 5GS", 3GPP Draft; S2-174565, vol. SA WG2, no. Cabo, Mexico; Jun. 20, 2017 (Jun. 20, 2017), XP051309619. 2 pages.
Office Action of the Indian application No. 202117012734, dated Mar. 8, 2022. 5 pages with English translation.
Qualcomm Incorporated, AT&T, Ericsson, "Use of the URSP rules when UE attaches to EPS", 3GPP TSG-SA WG2 Meeting #134, S2-1907194, Jun. 24-28, 2019, Sapporo, Japan. 7 pages.
Supplementary European Search Report in the European application No. 19934360.9, dated Jul. 30, 2021. 11 pages.
Written Opinion of the International Search Authority in the international application No. PCT/CN2019/096231, dated Apr. 1, 2020. 8 pages with English translation.
Written Opinion of the Singaporean application No. 11202008917Q, dated May 23, 2022. 9 pages.
First Office Action of the Chinese application No. 202110088081.5, dated Jul. 8, 2022. 12 pages with English translation.

* cited by examiner

INTER-SYSTEM POLICY USING METHOD, USER EQUIPMENT, AND COMPUTER STORAGE MEDIUM

CROSS-REFERENCE TO RELATED APPLICATIONS

This is a continuation application of International Patent Application No. PCT/CN2018/079052, filed on Mar. 14, 2018. The entire contents of the above application are incorporated herein by reference in its entirety.

BACKGROUND

In a communications system, policies of a terminal device, such as UE, may include a WLANSP policy and a URSP policy. The URSP policy in UE policies is used when different applications are applied for different network slices. Currently, related content has been formulated in the URSP policy.

SUMMARY

The present invention relates to the field of information processing technologies, and in particular, to an inter-system policy using method, user equipment (UE), and a computer storage medium.

To resolve the foregoing technical problems, embodiments of the present invention provide an inter-system policy using method, UE, and a computer storage medium.

Some embodiments of the present invention provide an inter-system policy using method, including:

using a first UE policy applied to a first system when traffic is processed in the first system; and using a UE policy applied to a second system when traffic is processed in the second system, where the UE policy applied to an EPS system and the first UE policy applied to a 5GS system are applied to same UE.

Some embodiments of the present invention provide UE, including:

a processing unit, configured to use a first UE policy applied to a first system when traffic is processed in the first system, and use a UE policy applied to a second system when traffic is processed in the second system, where the UE policy applied to an EPS system and the first UE policy applied to a 5GS system are applied to same UE.

Some embodiments of the present invention provide UE, including: a processor and a memory configured to store a computer program that can be run on the processor, where the processor is configured to perform the operations of the foregoing method when the processor runs the computer program.

Some embodiments of the present invention provide a computer storage medium, where the computer storage medium stores a computer-executable instruction, and when the computer-executable instruction is executed, the operations of the foregoing method are performed.

DETAILED DESCRIPTION

Currently, the URSP policy is merely used in a 5GS system, and when the UE is handed over between the 5GS and an EPS, it is unclear how the UE is bound to an application.

By using the technical solutions of the embodiments of the present invention, it can be determined that the UE performs traffic processing by separately using different UE policies in two systems, so that UE policies for the UE to perform processing in different systems are specified, thereby ensuring continuity of traffic processing of the UE after a handover.

To make the features and technical content of the embodiments of the present invention more compressible, the following describes implementations of the embodiments of the present invention in detail with reference to the accompanying drawings. The accompanying drawings are intended for reference only, and are not intended to limit the embodiments of the present invention.

Embodiment 1

Figure 1:
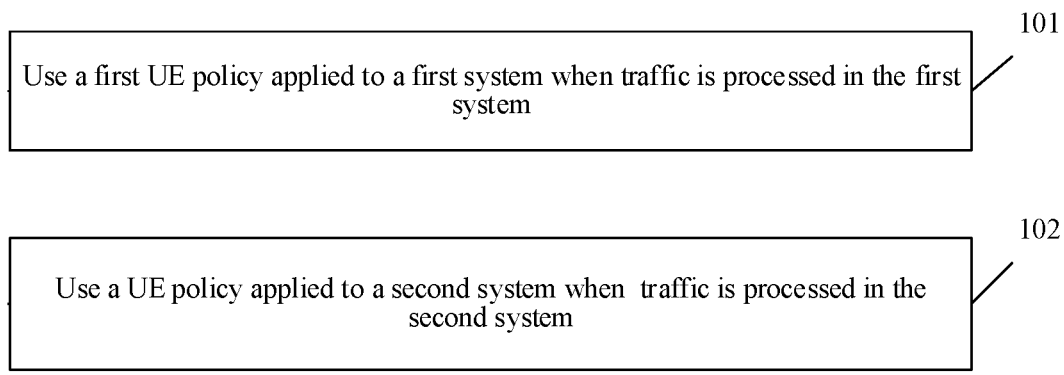
FIG. 1 is a schematic flowchart of an inter-system policy using method according to some embodiments of the present invention.

An embodiment of the present invention provides an inter-system policy using method. As shown in FIG. 1, the method includes the following operations:

Operation 101: Use a first UE policy applied to a first system when traffic is processed in the first system. Operation 102: Use a UE policy applied to a second system when traffic is processed in the second system.

The UE policy applied to an EPS system and the first UE policy applied to a 5GS system are applied to same UE.

The first system may be understood as the 5GS system, and the second system may be understood as the EPS system.

It should be noted that, there is no fixed sequential relationship between operation 101 and operation 102. Operation 102 may be performed first, and then, operation 101 is performed during a handover to the 5GS system. Certainly, operation 101 may also be performed in the 5GS system, and then, operation 102 is performed after a handover to the EPS system.

A policy provided in this embodiment may be a URSP policy formulated on the 5GS and the EPS. In addition, introducing a DCN-ID (the DCN-ID is used on a dedicated network of the EPS, and corresponds to S-NSSAI of the 5GS) to the URSP may be considered. A set of rules that are used on the EPS and that correspond to rules used on the 5GS may be input into the URSP.

For the URSP policy, refer to the following example. For example, the URSP policy may include a URSP rule 1 (rule 1):

Policy: 1
Traffic filter: App=DummyApp
Direct offload: Prohibited
Slice Info: S-NSSAI-a
Continuity Types: SSC Mode 3
DNNs: internet
Access Type: 3GPP access.
URSP rule 2 (rule 2):
Traffic filter: App (application)=App1, App2
Direct offload: Permitted
Slice Info: S-NSSAI-a
Access Type: Non-3GPP access.

The following gives an example about a route selection policy of UE with reference to Table 1 and Table 2.

As shown in the following table:

TABLE 1

UE Route Selection Policy Rule

| Information name | Description | Type | Whether a PCF is allowed to adjust a UE context | Range |
|---|---|---|---|---|
| Rule precedence | Determine an execution order of URSP rules in UE | Mandatory execution | Yes | UE context |
| Traffic descriptor | Traffic description of a using policy | | | |
| Rule precedence | Determine an execution order of URSP rules in UE | Mandatory execution | Yes | UE context |
| Application identifier | Application identifier | Optional | Yes | UE context |
| IP descriptor | IP triplet | Optional | Yes | UE context |
| No IP descriptor | Description for no IP traffic | Optional | Yes | UE context |
| List of route selection descriptors | Table 6.6.2-2. | Mandatory execution | | |

TABLE 2

| Information name | Description | Type | Whether a PCF is allowed to adjust a UE context | Range |
|---|---|---|---|---|
| Route selection precedence | Determines the order in which the Route Selection Descriptors are to be applied. | Execution | Yes | UE context |
| Route selection composition | This part defines the route selection components | Execution | | |
| SSC mode selection | One single value of SSC mode. | Optional | Yes | UE context |
| Network slice selection | One value is used to represent S-NSSAI, or a list of values are used to represent a plurality of pieces of S-NSSAI | Optional | Yes | UE context |
| DNN selection | Either one single value or a list of values of DNN(s). | Optional | Yes | UE context |
| Non-seamless offload indication | Indicates if the traffic of the matching application is to be offloaded to non-3GPP access outside of a PDU Session. | Optional | Yes | UE context |
| Preferred access type | Indicates the preferred Access Type (3GPP or non-3GPP) when the UE establishes a PDU Session for the matching application. | Optional | Yes | UE context |

In this embodiment, descriptions are made below by always using a 5GS system as the first system and an EPS system as the second system. Specifically, for a UE policy applied to the EPS system, there may be a plurality of configuration manners as follows.

Manner 1: A UE policy applied to the second system is a second UE policy.

Parameters in the second UE policy and parameters in a first UE policy are all separately defined.

To be specific, a 5GS rule and an EPS rule that are separate are used. The UE policy applied to the EPS system is the second UE policy, and the parameters in the second UE policy and the parameters in the first UE policy are all separately defined.

That is, a set of EPS Rules corresponding to the 5GS URSP Rules is directly introduced, and all parameters are separately defined.

Manner 2: A UE policy applied to the second system is a second UE policy.

At least some of the parameters in the second UE policy and at least some of the parameters of the first UE policy are different, and there is a mapping relationship between the at least some of the parameters of the second UE policy and the at least some of the parameters of the first UE policy.

That is, a UE policy applied to the EPS system is the second UE policy.

At least some of the parameters in the second UE policy and at least some of the parameters of the first UE policy are different, and there is a mapping relationship between the at least some of the parameters of the second UE policy and the at least some of the parameters of the first UE policy.

Specifically, a dedicated core network DCN identifier and an APN are configured in the second UE policy.

A DCN identifier in the first UE policy corresponds to S-NSSAI in the first UE policy, and the APN in the second UE policy corresponds to a DNN in the first UE policy.

For example, referring to Table 2 above, when Precedence and a Traffic Descriptor in Table-1 in the 5GS URSP Rules are reused, for a set of parameters for the EPS added to an RSD, mapping relationships are as follows:

SSC Mode Selection →SSC Mode Selection

S-NSSAI →DCN-ID

DNN →APN

Non-seamless Offload indication →Non-seamless Offload indication

Access Type preference →Access Type preference

It should be further noted that, the foregoing one or more parameters may be set to "empty", that is, there is a specified value on the 5GS, but there is no value on the EPS.

Herein, it should be further noted that, for a configuration method for the first UE policy and the second UE policy, for example, when the UE obtains the first UE policy configured by a network side on the first system, the UE obtains the second UE policy that is applied to the second system and policy that is sent by a network side to the UE.

That is, the method may include: obtaining the second UE policy that is applied to the EPS system and that is sent by the network side to the UE when the UE obtains the first UE policy of the 5GS system configured by the network side on the 5GS system.

In addition, the UE receives the second UE policy delivered by the network side when the UE accesses the second system.

The foregoing separate EPS URSP policy may be configured in two manners:

While a 5GS URSP policy is configured on the 5GS, an EPS URSP policy is also delivered; and when the UE is attached to the EPS, the EPS URSP policy is delivered to the UE.

Manner 3: A set of 5GS URSP policies is still used.

The configured policy applied to the second system is the same as the first UE policy, that is, the configured policy applied to the EPS system is the same as the first UE policy.

Alternatively, the configured policy applied to the second system is partially the same as the first UE policy, that is, the configured policy applied to the EPS system is partially the same as the first UE policy.

For example, for a DNN parameter, there is a 5GS-EPS mapping relationship, and other parameters are kept unchanged: DNN →APN.

Except for that the UE policy applied to the EPS system is different from the first UE policy of the 5GS system in terms of the DNN parameter and/or the S-NSSAI parameter, the remaining parameters of the UE policy applied to the EPS system are same as those of the first UE policy.

In addition, the DNN in the first UE policy applied to the 5GS system corresponds to an APN in the UE policy of the EPS system, the S-NSSAI in the first UE policy applied to the 5GS system corresponds to a DCN identifier in the UE policy applied to the EPS system, and a mapping relationship between the APN in the UE policy applied to the EPS system and the DNN in the first UE policy and/or a mapping relationship between a DCN identifier applied to the EPS system and the S-NSSAI in the first UE policy are/is configured.

The following focuses on describing use of a UE policy.

The second UE policy is used when the UE is connected to the second system.

The second system receives the second UE policy by using an attachment acknowledgment message when the UE is connected to the second system through an attachment procedure. That is, the EPS receives the second UE policy by using an attachment reply message when the UE is attached to the EPS system.

Specifically, when the UE is attached to the EPS, the UE uses a URSP policy of the EPS and uses a URSP policy of the 5GS.

When the UE establishes a PDN Connection on the EPS, S-NSSAI and/or a DNN corresponding to the PDN Connection are/is returned. If a returned message includes the DNN, the UE directly uses the DNN. If the DNN is not returned, then the UE autonomously performs mapping processing to obtain a corresponding APN. The UE selects, based on the URSP policy used on the 5GS, a PDN Connection for a specific data flow to perform data transmission.

Processing is performed by using the first UE policy when the UE is registered with the 5GS system.

To ensure traffic continuity in a handover procedure, a URSP execution manner after a 5GS →EPS handover to the EPS is used as follows.

A corresponding relationship between a PDU session and the PDN connection is stored after the UE completes establishment of the PDU session. After the UE completes establishment of the PDU Session by using the S-NSSAI, the UE stores an EPS Bearer ID sent by the network side to the UE. In addition, the EPS Bearer ID may further be used as an identifier of the PDN Connection corresponding to the PDU Session.

It should be noted that, association is performed on a corresponding relationship between the PDU session and the PDN connection by using a bearer identifier of the second system.

It should be understood that the bearer identifier is a default bearer identifier.

Specifically, after the UE completes establishment of a PDU session on the 5GS, the UE stores an EPS default bearer identifier corresponding to the PDN connection on the EPS corresponding to the PDU session. Before a handover is performed, a default bearer identifier on the second system corresponding to the PDN connection on the second system corresponding to the PDU session sent by the network side is stored.

When the UE is handed over from the 5GS system to the EPS system, the UE determines, based on a PDU session corresponding to the first UE policy of the 5GS system, to hand over application data to a PDN connection corresponding to the EPS bearer identifier corresponding to the PDU session. That is, when a 5GS →EPS handover occurs, the UE determines, based on a PDU Session corresponding to a URSP policy of the 5GS, to place application data to a PDN Connection corresponding to an EPS Bearer ID corresponding to an original PDU Session.

In addition, there is another case. When the UE is handed over from the first system to the second system and the PDN connection corresponding to the PDU session is deleted or cannot be handed over, a PDU session and a PDN connection corresponding to a parameter combination corresponding to a second preferred UE policy rule of the first system are selected based on precedence of the first UE policy of the first system, a corresponding target PDU session is determined based on the parameter combination corresponding to the second preferred UE policy rule, and application data is handed over to a PDN connection corresponding to the target PDU session.

That is, when the UE is handed over from the 5GS system to the EPS system, and the PDN connection corresponding to the PDU session is deleted or cannot be handed over, a second preferred UE policy of the 5GS is selected based on precedence of the first UE policy of the 5GS, a corresponding target PDU session is determined based on the selected second preferred UE policy, and application data is handed over to a PDN connection corresponding to the target PDU session. That is, for a case in which a PDN Connection corresponding to the original PDU Session is deleted in the handover procedure, the UE searches, based on Rule Precedence (precedence) in the URSP, for a PDN Connection corresponding to a PDU Session corresponding to a second preferred URSP Rule parameter, and transfers a data flow of the application to the PDN Connection.

It should be understood that, the parameter combination corresponding to the second preferred UE policy rule of the first system may be understood as follows: a plurality of UE policy rules corresponding to a plurality of orders of precedence currently exist (each policy rule may correspond to a parameter combination); then, a most preferred policy rule is selected from the plurality of orders of precedence, and whether a PDU session and a PDN connection corresponding to the policy rule are a PDN connection to which application data can be handed over is determined; if yes, the policy rule may be understood as a parameter combination corresponding to the second preferred UE policy of the first system; otherwise, a less preferred policy rule is selected, and so on until a PDN connection to which the application data can be handed over is selected, and it is determined that a parameter combination corresponding to the second preferred UE policy rule of the first system is selected.

Figure 2:
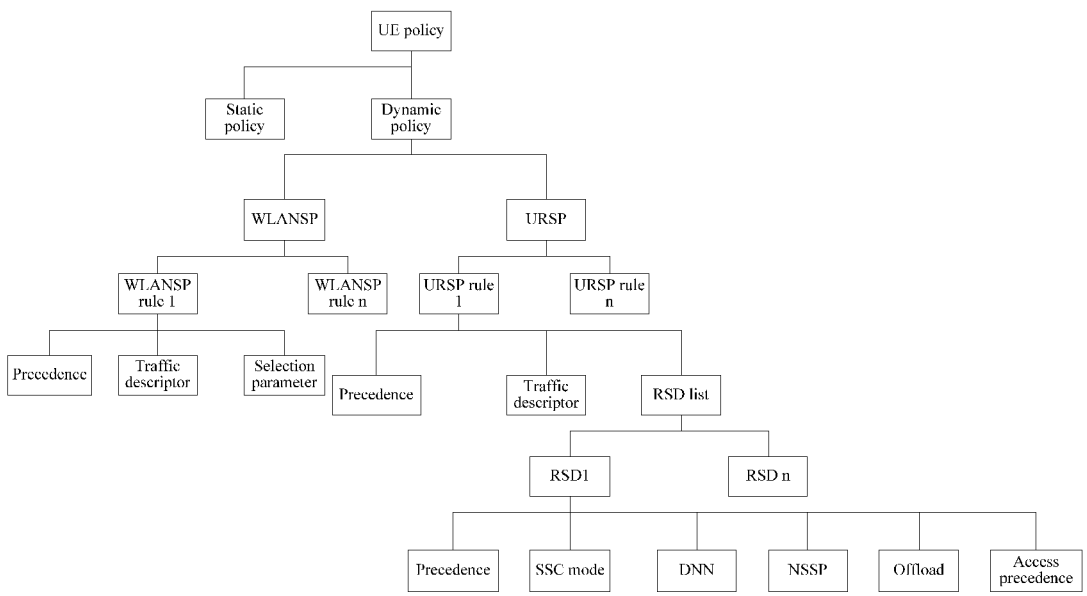
FIG. 2 is a schematic diagram of a policy included in UE.

For a relationship between a policy and a policy rule, refer to FIG. 2. UE policies may include a static policy and a dynamic policy, and this embodiment is directed to a dynamic policy. The dynamic policy further includes a WLANSP and a URSP. The URSP may include a plurality of rules, for example, may include precedence, traffic description, and an RSD list. The RSD list may further include a combination of a plurality of parameters such as precedence, an SSC mode, and a DNN. Details are not described herein again.

Second preference means that the UE selects another parameter combination that meets a Rule corresponding to the Traffic Descriptor for the foregoing data flow if a current PDU Session is not handed over, and the another parameter combination includes: a second parameter combination in a same RSD, and a parameter combination in another RSD.

A definition of precedence: Precedence of URSP Rules is used to determine a sequential order of using the Rules; contents described in Traffic descriptors in a plurality of Rules overlap, PDU Sessions of the overlapped data flows is transferred by preferentially using a URSP Rule that has higher Precedence.

Finally, it should be noted that, although description is made by mainly using a traffic processing manner during a handover from the 5GS system to the EPS system in this embodiment, an EPS- 5GS handover also has a same mechanism, and details are not described again.

It can be seen that, by using the foregoing solution, it can be determined that the UE performs traffic processing in the 5GS system and the EPS system by separately using different UE policies, so that UE policies for the UE to perform processing in different systems are specified, thereby ensuring continuity of UE traffic processing after a handover.

Embodiment 2

Figure 3:
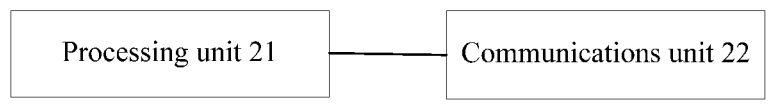
FIG. 3 is a schematic structural diagram of composition of UE according to some embodiments of the present invention.

An embodiment of the present invention provides UE. As shown in FIG. 3, the UE includes:

a processing unit 21, configured to use a first UE policy applied to a first system when traffic is processed in the first system, and use a UE policy applied to a second system when traffic is processed in the second system.

The UE policy applied to the second system and the first UE policy applied to the first system are applied to same UE.

The first system may be understood as a 5GS system, and the second system may be understood as an EPS system.

A policy provided in this embodiment may be a URSP policy formulated on the 5GS and the EPS. In addition, introducing a DCN-ID (the DCN-ID is used on a dedicated network of the EPS, and corresponds to S-NSSAI of the 5GS) to the URSP may be considered. A set of rules that are used on the EPS and that correspond to rules used on the 5GS may be input into the URSP.

For the URSP policy, refer to the following example. For example, the URSP policy may include a URSP rule 1 (rule 1):

Policy: 1
Traffic filter: App=DummyApp
Direct offload: Prohibited
Slice Info: S-NSSAI-a
Continuity Types: SSC Mode 3
DNNs: internet
Access Type: 3GPP access.
URSP rule 2 (rule 2):
Traffic filter: App (application)=App1, App2
Direct offload: Permitted
Slice Info: S-NSSAI-a
Access Type: Non-3GPP access.

In this embodiment, descriptions are made below by always using a 5GS system as the first system and an EPS system as the second system. Specifically, for a UE policy applied to the EPS system, there may be a plurality of configuration manners as follows.

Manner 1: A UE policy applied to the second system is a second UE policy.

Parameters in the second UE policy and parameters in a first UE policy are all separately defined.

To be specific, a 5GS rule and an EPS rule that are separate are used. The UE policy applied to the EPS system is the second UE policy, and the parameters in the second UE policy and the parameters in the first UE policy are all separately defined.

That is, a set of EPS Rules corresponding to the 5GS URSP Rules is directly introduced, and all parameters are separately defined.

Manner 2: A UE policy applied to the second system is a second UE policy.

At least some of the parameters in the second UE policy and at least some of the parameters of the first UE policy are different, and there is a mapping relationship between the at least some of the parameters of the second UE policy and the at least some of the parameters of the first UE policy.

That is, a UE policy applied to the EPS system is the second UE policy.

At least some of the parameters in the second UE policy and at least some of the parameters of the first UE policy are different, and there is a mapping relationship between the at least some of the parameters of the second UE policy and the at least some of the parameters of the first UE policy.

Specifically, a dedicated core network DCN identifier and an APN are configured in the second UE policy.

A DCN identifier in the first UE policy corresponds to S-NSSAI in the first UE policy, and the APN in the second UE policy corresponds to a DNN in the first UE policy.

For example, referring to Table 2 above, when Precedence and a Traffic Descriptor in Table-1 in the 5GS URSP Rules are reused, for a set of parameters for the EPS added to an RSD, mapping relationships are as follows:

SSC Mode Selection→SSC Mode Selection
S-NSSAI→DCN-ID
DNN→APN
Non-seamless Offload indication→Non-seamless Offload indication
Access Type preference→Access Type preference It should be further noted that, the foregoing one or more parameters may be set to "empty", that is, there is a specified value on the 5GS, but there is no value on the EPS.

Herein, it should be further noted that, for the configuration method for the first UE policy and the second UE policy, for example, the UE further includes:

a communications unit 22, configured to obtain the second UE policy that is applied to the second system and that is sent by a network side to the UE when the UE obtains the first UE policy configured by the network side on the first system. That is, the UE obtains the second UE policy that is applied to the EPS system and that is sent by the network side to the UE when the UE obtains the first UE policy of the 5GS system configured by the network side on the 5GS system. The UE receives the second UE policy delivered by the network side when the UE is attached to the EPS system.

That is, the foregoing separate EPS URSP policy may be configured in two manners:

When the first UE policy of the 5GS system is configured on the 5GS system, the second UE policy that is applied to the EPS system and that is sent to the UE is configured. In addition, when access is performed on the second system, the second UE policy is delivered.

Manner 3: A set of 5GS URSP policies is still used.

The configured policy applied to the EPS system is the same as the first UE policy.

Alternatively, the configured policy applied to the EPS system is partially the same as the first UE policy.

For example, for a DNN parameter, there is a 5GS-EPS mapping relationship, and other parameters are kept unchanged: DNN→APN.

Except for that the UE policy applied to the EPS system is different from the first UE policy of the 5GS system in terms of the DNN parameter and/or the S-NSSAI parameter, the remaining parameters of the UE policy applied to the EPS system are same as those of the first UE policy.

In addition, the DNN in the first UE policy applied to the 5GS system corresponds to an APN in the UE policy of the EPS system, the S-NSSAI in the first UE policy applied to the 5GS system corresponds to a DCN identifier in the UE policy applied to the EPS system, and a mapping relationship between the APN in the UE policy applied to the EPS system and the DNN in the first UE policy and/or a mapping relationship between a DCN identifier applied to the EPS system and the S-NSSAI in the first UE policy are/is configured.

The following focuses on describing use of a UE policy.

The second UE policy is used when the UE is connected to the second system.

The second system receives the second UE policy by using an attachment acknowledgment message when the UE is connected to the second system through an attachment procedure.

The EPS receives the second UE policy by using an attachment reply message when the UE is attached to the EPS system.

Specifically, when the UE is attached to the EPS, the UE uses a URSP policy of the EPS and uses a URSP policy of the 5GS.

When the UE establishes a PDN Connection on the EPS, S-NSSAI and/or a DNN corresponding to the PDN Connection are/is returned. If a returned message includes the DNN, the UE directly uses the DNN. If the DNN is not returned, then the UE autonomously performs mapping processing to obtain a corresponding APN. The UE selects, based on the URSP policy used on the 5GS, a PDN Connection for a specific data flow to perform data transmission.

Processing is performed by using the first UE policy when the UE is registered with the 5GS system.

To ensure traffic continuity in a handover procedure, a URSP execution manner after a 5GS→EPS handover to the EPS is used as follows.

A corresponding relationship between a PDU session and the PDN connection is stored after the UE completes establishment of the PDU session. After the UE completes establishment of the PDU Session by using the S-NSSAI, the UE stores an EPS Bearer ID sent by the network side to the UE. In addition, the default EPS Bearer ID may further be used as an identifier of the PDN Connection corresponding to the PDU Session.

It should be noted that, association is performed on a corresponding relationship between the PDU session and the PDN connection by using a bearer identifier of the second system.

The bearer identifier may be understood as a default bearer identifier.

Specifically, after the UE completes establishment of a PDU session on the 5GS, the UE stores an EPS default bearer identifier corresponding to the PDN connection on the EPS corresponding to the PDU session. Before a handover is performed, a default bearer identifier on the second system corresponding to the PDN connection on the second system corresponding to the PDU session sent by the network side is stored.

When the UE is handed over from the 5GS system to the EPS system, the UE determines, based on a PDU session corresponding to the first UE policy of the 5GS system, to hand over application data to a PDN connection corresponding to the EPS bearer identifier corresponding to the PDU session. That is, when a 5GS→EPS handover occurs, the UE determines, based on a PDU Session corresponding to a URSP policy of the 5GS, to place application data to a PDN Connection corresponding to an EPS Bearer ID corresponding to an original PDU Session.

In addition, there is another case. When the UE is handed over from the first system to the second system and the PDN connection corresponding to the PDU session is deleted or cannot be handed over, a PDU session and a PDN connection corresponding to a parameter combination corresponding to a second preferred UE policy rule of the first system are selected based on precedence of the first UE policy of the first system, a corresponding target PDU session is determined based on the parameter combination corresponding to the second preferred UE policy rule, and application data is handed over to a PDN connection corresponding to the target PDU session.

That is, when the UE is handed over from the 5GS system to the EPS system, and the PDN connection corresponding to the PDU session is deleted or cannot be handed over, a second preferred UE policy of the 5GS is selected based on precedence of the first UE policy of the 5GS, a corresponding target PDU session is determined based on the selected second preferred UE policy, and application data is handed over to a PDN connection corresponding to the target PDU session. That is, for a case in which a PDN Connection corresponding to the original PDU Session is deleted in the handover procedure, the UE searches, based on Rule Precedence (precedence) in the URSP, for a PDN Connection corresponding to a PDU Session corresponding to a second preferred URSP Rule parameter, and transfers a data flow of the application to the PDN Connection.

It should be understood that, the parameter combination corresponding to the second preferred UE policy rule of the first system may be understood as follows: a plurality of UE policy rules corresponding to a plurality of orders of precedence currently exist (each policy rule may correspond to a parameter combination); then, a most preferred policy rule is selected from the plurality of orders of precedence, and whether a PDU session and a PDU connection corresponding to the policy rule are a PDN connection to which application data can be handed over is determined; if yes, the policy rule may be understood as a parameter combination corresponding to the second preferred UE policy of the first system; otherwise, a less preferred policy rule is selected, and so on until a PDN connection to which the application data can be handed over is selected, and it is determined that a parameter combination corresponding to the second preferred UE policy rule of the first system is selected.

For a relationship between a policy and a policy rule, refer to FIG. 2. UE policies may include a static policy and a dynamic policy, and this embodiment is directed to a dynamic policy. The dynamic policy further includes a WLANSP and a URSP. The URSP may include a plurality of rules, for example, may include precedence, traffic description, and an RSD list. The RSD list may further include a combination of a plurality of parameters such as precedence, an SSC mode, and a DNN. Details are not described herein again.

Second preference means that the UE selects another parameter combination that meets a Rule corresponding to the Traffic Descriptor for the foregoing data flow if a current PDU Session is not handed over, and the another parameter combination includes: a second parameter combination in a same RSD, and a parameter combination in another RSD.

A definition of precedence: Precedence of URSP Rules is used to determine a sequential order of using the Rules; contents described in Traffic descriptors in a plurality of Rules overlap, PDU Sessions of the overlapped data flows is transferred by preferentially using a URSP Rule that has higher Precedence.

Finally, it should be noted that, although description is made by mainly using a traffic processing manner during a handover from the 5GS system to the EPS system in this embodiment, an EPS→5GS handover also has a same mechanism, and details are not described again.

It can be seen that, by using the foregoing solution, it can be determined that the UE performs traffic processing in the 5GS system and the EPS system by separately using different UE policies, so that UE policies for the UE to perform processing in different systems are specified, thereby ensuring continuity of UE traffic processing after a handover.

Figure 4:
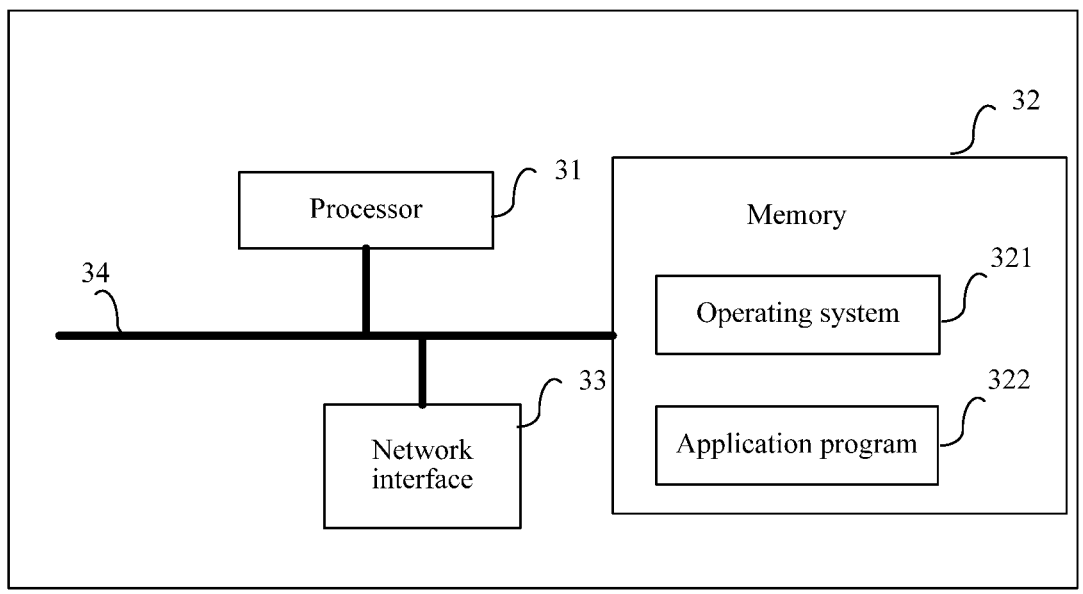
FIG. 4 is a schematic diagram of a hardware architecture according to some embodiments of the present invention.

Some embodiments of the present invention further provide a hardware composition architecture of user equipment or a receiver device. As shown in FIG. 4, the hardware composition architecture includes at least one processor 31, a memory 32, and at least one network interface 33. All the components are coupled together through a bus system 34. It may be understood that the bus system 34 is configured to implement a connection and communication between the components. The bus system 34 further includes a power supply bus, a control bus, and a status signal bus in addition to a data bus. However, for the purpose of clear description, all buses are marked as the bus system 34 in FIG. 4.

It may be understood that the memory 32 in the embodiments of the present invention may be a volatile memory or a nonvolatile memory, or may include both of a volatile memory and a nonvolatile memory.

In some implementations, the memory 32 stores the following elements: an executable module or a data structure, or a subset thereof, or an extended set thereof:

an operating system 321 and an application program 322.

The processor 31 is configured to perform the method operations of the foregoing Embodiment 1. Details are not described herein again.

An embodiment of the present invention provides a computer storage medium, where the computer storage medium stores a computer-executable instruction, and when the computer-executable instruction is executed, the operations of the foregoing Embodiment 1 are performed.

In the embodiments of the present invention, if implemented in a form of a software functional module and sold or used as an independent product, the foregoing apparatus may alternatively be stored in a computer-readable storage medium. Based on such an understanding, the technical solutions of the embodiments of the present invention essentially or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present invention. The foregoing storage medium includes: various mediums that can store program code, for example, a USB flash drive, a removable hard disk, a read-only memory (ROM, Read-Only Memory), a magnetic disk, or an optical disc. In this way, the embodiments of the present invention are not limited to any specific combination of hardware and software.

Correspondingly, an embodiment of the present invention further provides a computer storage medium storing a computer program, where the computer program is configured to perform a data scheduling method in an embodiment of the present invention.

Although for a purpose of illustration, preferred embodiments of the present invention are disclosed, a person skilled in the art should be aware of that a variety of improvements, additions, and substitutions are possible. Therefore, the scope of the present invention should not be limited to the foregoing embodiments.

The invention claimed is:

1. An inter-system policy using method, comprising:
using a first User Equipment (UE) policy applied to a first system when traffic is processed in the first system; and using a UE policy applied to a second system when traffic is processed in the second system, wherein
the UE policy applied to the second system and the first UE policy applied to the first system are applied to same UE,
wherein the UE policy applied to the second system is a second UE policy; and
at least some of the parameters in the second UE policy and at least some of the parameters of the first UE policy are different, and there is a mapping relationship between the at least some of the parameters of the second UE policy and the at least some of the parameters of the first UE policy,
wherein the UE policy is User Equipment Routing Selection Policy (URSP), a Precedence parameter in a rule of the first UE policy is the same with that in a rule of the second UE policy, and a Traffic Descriptor parameter in a rule of the first UE policy is the same with that in a rule of the second UE policy.

2. The method according to claim 1, wherein the method further comprises:
obtaining the second UE policy that is applied to the second system and that is sent by a network side to the UE when the UE obtains the first UE policy configured by the network side on the first system.

3. The method according to claim 1, wherein the method further comprises:
receiving the second UE policy delivered by a network side when the UE accesses the second system.

4. The method according to claim 1, wherein the method further comprises:
using the second UE policy when the UE is connected to the second system.

5. The method according to claim 1, wherein:
the first system is a $5^{th}$ Generation System (5GS), and the second system is an Evolved Packet System (EPS).

6. The method according to claim 1, wherein a rule of the first UE policy has a first Route Selection Descriptor (RSD) and a rule of the second UE policy has a second RSD, wherein there is a mapping relationship between at least some of parameters in the first RSD and at least some of parameters in the second RSD.

7. A User Equipment (UE), comprising:
a processor, configured to use a first UE policy applied to a first system when traffic is processed in the first system, and use a UE policy applied to a second system when traffic is processed in the second system, wherein the UE policy applied to the second system and the first UE policy applied to the first system are applied to same UE, wherein the UE policy applied to the second system is a second UE policy; and at least some of the parameters in the second UE policy and at least some of the parameters of the first UE policy are different, and there is a mapping relationship between the at least some of the parameters of the second UE policy and the at least some of the parameters of the first UE policy, wherein the UE policy is User Equipment Routing Selection Policy (URSP), a Precedence parameter in a rule of the first UE policy is the same with that in a rule of the second UE policy, and a Traffic Descriptor parameter in a rule of the first UE policy is the same with that in a rule of the second UE policy.

8. The UE according to claim 7, wherein the UE policy applied to the second system is a second UE policy; and parameters in the second UE policy and parameters in the first UE policy are all separately defined.

9. The UE according to claim 8, wherein the UE further comprises:

a network interface, configured to obtain the second UE policy that is applied to the second system and that is sent by a network side when obtaining the first UE policy configured by the network side on the first system.

10. The UE according to claim 8, wherein the UE further comprises:

a network interface, configured to receive the second UE policy delivered by a network side during attachment to the second system.

11. The UE according to claim 8, wherein the processor uses the second UE policy when the UE is connected to the second system.

12. The UE according to claim 7, wherein the first system is a 5$^{th}$ Generation System (5GS), and the second system is an Evolved Packet System (EPS).

13. The UE according to claim 7, wherein a rule of the first UE policy has a first Route Selection Descriptor (RSD) and a rule of the second UE policy has a second RSD, wherein there is a mapping relationship between at least some of parameters in the first RSD and at least some of parameters in the second RSD.

14. A non-transitory computer storage medium, wherein the non-transitory computer storage medium stores computer-executable instructions, and the computer-executable instructions when being executed by a processor, cause the processor to:

use a first User Equipment (UE) policy applied to a first system when traffic is processed in the first system; and using a UE policy applied to a second system when traffic is processed in the second system, wherein the UE policy applied to the second system and the first UE policy applied to the first system are applied to same UE, at least some of the parameters in the second UE policy and at least some of the parameters of the first UE policy are different, and there is a mapping relationship between the at least some of the parameters of the second UE policy and the at least some of the parameters of the first UE policy, wherein the UE policy is User Equipment Routing Selection Policy (URSP), a Precedence parameter in a rule of the first UE policy is the same with that in a rule of the second UE policy, and a Traffic Descriptor parameter in a rule of the first UE policy is the same with that in a rule of the second UE policy.

15. The non-transitory computer storage medium according to claim 14, wherein the processor is further caused to:

obtain the second UE policy that is applied to the second system and that is sent by a network side to the UE when the UE obtains the first UE policy configured by the network side on the first system.

* * * * *